(No Model.)
A. H. HOLLENDER.
DOUGH RAISER.
No. 464,872.　　　　　　　　Patented Dec. 8, 1891.
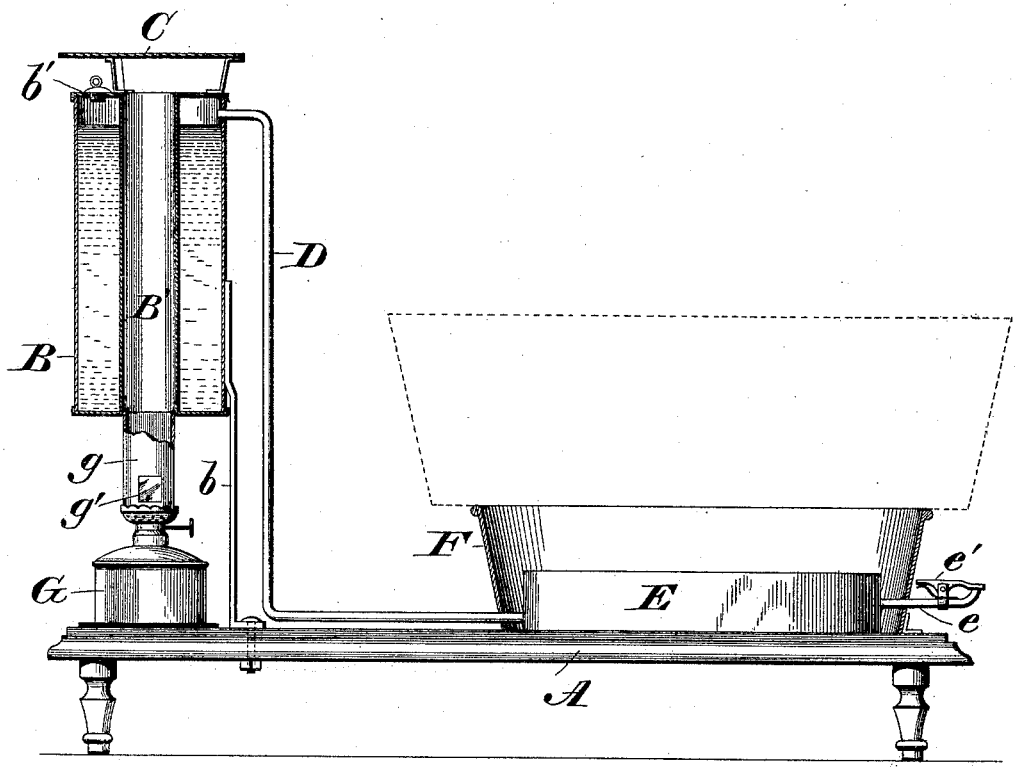
August H. Hollender.
Inventor

United States Patent Office.

AUGUST H. HOLLENDER, OF BLUE EARTH CITY, MINNESOTA.

DOUGH-RAISER.

SPECIFICATION forming part of Letters Patent No. 464,872, dated December 8, 1891.

Application filed April 30, 1891. Serial No. 391,132. (No model.)

*To all whom it may concern:*

Be it known that I, AUGUST H. HOLLENDER, a citizen of the United States of America, residing at Blue Earth City, in the county of Faribault and State of Minnesota, have invented certain new and useful Improvements in Dough-Raisers; and I do hereby declare the following to be a full, clear, and exact description of the invention, such as will enable others skilled in the art to which it appertains to make and use the same, reference being had to the accompanying drawing, and to the letters of reference marked thereon, which form a part of this specification.

This invention relates to improvements in dough-raisers.

The object of the invention is to provide a cheap, simple, and effective device for keeping dough at a proper temperature for raising; and it consists in the construction and combination of the parts, as will be hereinafter fully set forth, and particularly pointed out in the claims.

In the accompanying drawing I have illustrated my invention by a vertical sectional view.

A designates a stand or table, at one end of which is supported a boiler B, having a central flue B' and an aperture b' for filling the same with water. Above the central flue in this boiler is secured a deflector C. In the upper end of the boiler passes a pipe or tube D, which leads into a closed chamber E, located upon the table A, and surrounding this chamber is a pan F, upon which the ordinary bread-pan is placed. From the chamber E, so as to pass out through the pan F, extends a pipe e, having an upturned end, which is closed by a spring-valve e'.

G designates the lamp, which is placed under the boiler and is provided with a metallic chimney g, apertured to receive a mica plate g'.

When it is desired to use the apparatus, the boiler is partially filled with water and the lamp lighted. The steam generated will pass through the pipe D into the chamber E, and if the pressure at any time becomes excessive the valve e' will be raised. The bread to be raised may be set directly upon the receptacle E or be placed in a bread-pan, which can rest upon the rim of the pan F.

I am aware that prior to my invention it has been proposed to provide dough-raisers with lamps for heating the same, so as to use the heat by conveying it to a compartment or box and by heating a water pan or receptacle contained in the box; but it will be observed that in my improved device the steam which is utilized to keep the dough at an even temperature does not come in contact with the dough. A device thus constructed is simple, cheap, and easily operated and may be used for other purposes than raising dough.

Having thus described my invention, what I claim as new, and desire to secure by Letters Patent, is—

1. In a dough-raiser, the combination of the base A, a boiler or steam-generator rigidly connected thereto and supported above the same, and a receptacle E, carried by the base and connected to the steam-supply by a pipe D, said receptacle having an outlet-pipe e and spring-actuated closing-valve e', substantially as set forth.

2. A dough-raiser consisting of a base A, a bracket or support rigidly secured thereto and adapted to maintain a boiler in a fixed position, said boiler having a central flue and deflector located above the same, a lamp or heating medium adapted to rest upon the base and provided with a chimney which leads into the flue of the boiler, a closed chamber E, connected to the boiler by a steam-supply pipe D, said closed receptacle being also provided with an outlet-pipe and means for closing the same, and a pan rigidly secured to the base and encircling the receptacle E, said pan having apertures through which the pipes D and e pass, the parts being combined and organized substantially as shown, and for the purpose set forth.

In testimony whereof I affix my signature in presence of two witnesses.

AUGUST H. HOLLENDER.

Witnesses:
 RICHARD RIMPLER,
 SILAS W. GRAHAM.